US007293701B2

(12) United States Patent
Halbur et al.

(10) Patent No.: US 7,293,701 B2
(45) Date of Patent: Nov. 13, 2007

(54) FINANCIAL TRANSACTION CARD WITH FRAME

(75) Inventors: Ted Halbur, Lino Lakes, MN (US); Travis Robertson, St. Louis Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 408 days.

(21) Appl. No.: 10/952,487

(22) Filed: Sep. 28, 2004

(65) Prior Publication Data

US 2006/0065748 A1 Mar. 30, 2006

(51) Int. Cl.
*G06K 5/00* (2006.01)

(52) U.S. Cl. ....................................... 235/380; 235/375

(58) Field of Classification Search ................ 235/380; 705/17

See application file for complete search history.

(56) References Cited

U.S. PATENT DOCUMENTS 4,887,763 A 12/1989 Sano
5,261,174 A 11/1993 Blegen
5,303,489 A 4/1994 Blegen
5,375,351 A 12/1994 King et al.
5,893,229 A 4/1999 Werner
5,983,537 A 11/1999 Johnson
6,010,338 A 1/2000 Watson
6,153,280 A 11/2000 Uffmann
6,216,377 B1 4/2001 Painsith
6,322,655 B1 11/2001 Casagrande
6,493,970 B1 12/2002 McCarthy et al.
6,578,304 B1 6/2003 Lytle
6,732,459 B1 5/2004 Clark
2001/0005953 A1 7/2001 Painsith
2001/0017465 A1 8/2001 Errard
2001/0025443 A1 10/2001 Martin
2003/0121194 A1 7/2003 Rappaport et al.
2005/0061889 A1* 3/2005 McGee et al. .............. 235/487

* cited by examiner

*Primary Examiner*—Lisa Caputo
(74) *Attorney, Agent, or Firm*—Ingrassia Fisher & Lorenz, P.C.

(57) ABSTRACT

A financial transaction card assembly includes a financial transaction card adapted for access to a financial account or record, and a frame supporting the financial transaction card, the frame comprising a magnetic material adapted to magnetically adhere to a surface. Related products and methods also are disclosed.

36 Claims, 8 Drawing Sheets

FINANCIAL TRANSACTION CARD WITH FRAME

BACKGROUND OF THE INVENTION

Stored-value cards and other financial transaction cards come in many forms. A gift card, for example, is a type of stored-value card that includes pre-loaded or selectably loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages, to both the customer and the retailer.

BRIEF DESCRIPTION OF THE DRAWINGS

Embodiments of the invention will be described with respect to the figures, in which like reference numerals denote like elements, and in which.

SUMMARY OF THE INVENTION

A financial transaction card assembly includes a financial transaction card adapted for access to a financial account or record, and a frame supporting the financial transaction card, the frame comprising a magnetic material adapted to magnetically adhere to a surface. Related products and methods also are disclosed.

DETAILED DESCRIPTION

A photo-frame magnet gift card includes a gift card or other financial transaction card sold as one unit with a magnetic photo frame. The window of the magnetic photo frame holds the gift card, according to one embodiment. The gift card can easily be popped out of the center of the magnetic frame, leaving a gift of the magnetic frame for adhering a photo or other display item on a refrigerator, cabinet in the office, or other desired surface.

According to one embodiment, a giver buys the gift card for a recipient to use toward film development, film, camera products, or other photo department purchases at a retail store. The photo department at the retail store can sponsor and promote the gift card program, according to one embodiment. The recipient of the gift card receives not only the gift of the gift card but also the gift of the photo frame, thereby receiving a complete "photo" gift package.

A gift card according to embodiments of the invention can be used throughout the retail store. Therefore, the gift card with magnetic frame is not restricted to use in the photo department, but is advantageous for use at any occasion for which a customer would want to frame a memory—e.g. a wedding, new baby, graduation, etc. In the case of a wedding, the bride and groom optionally use the gift card to shop for home needs and use the magnetic frame to frame a picture from the wedding, reception or honeymoon. A new mom can receive a gift card for baby needs and frame a picture of her new baby with the photo frame. The graduate can use the gift card to supply a dorm room or first apartment and the photo frame to capture friends or family.

Figure 1:
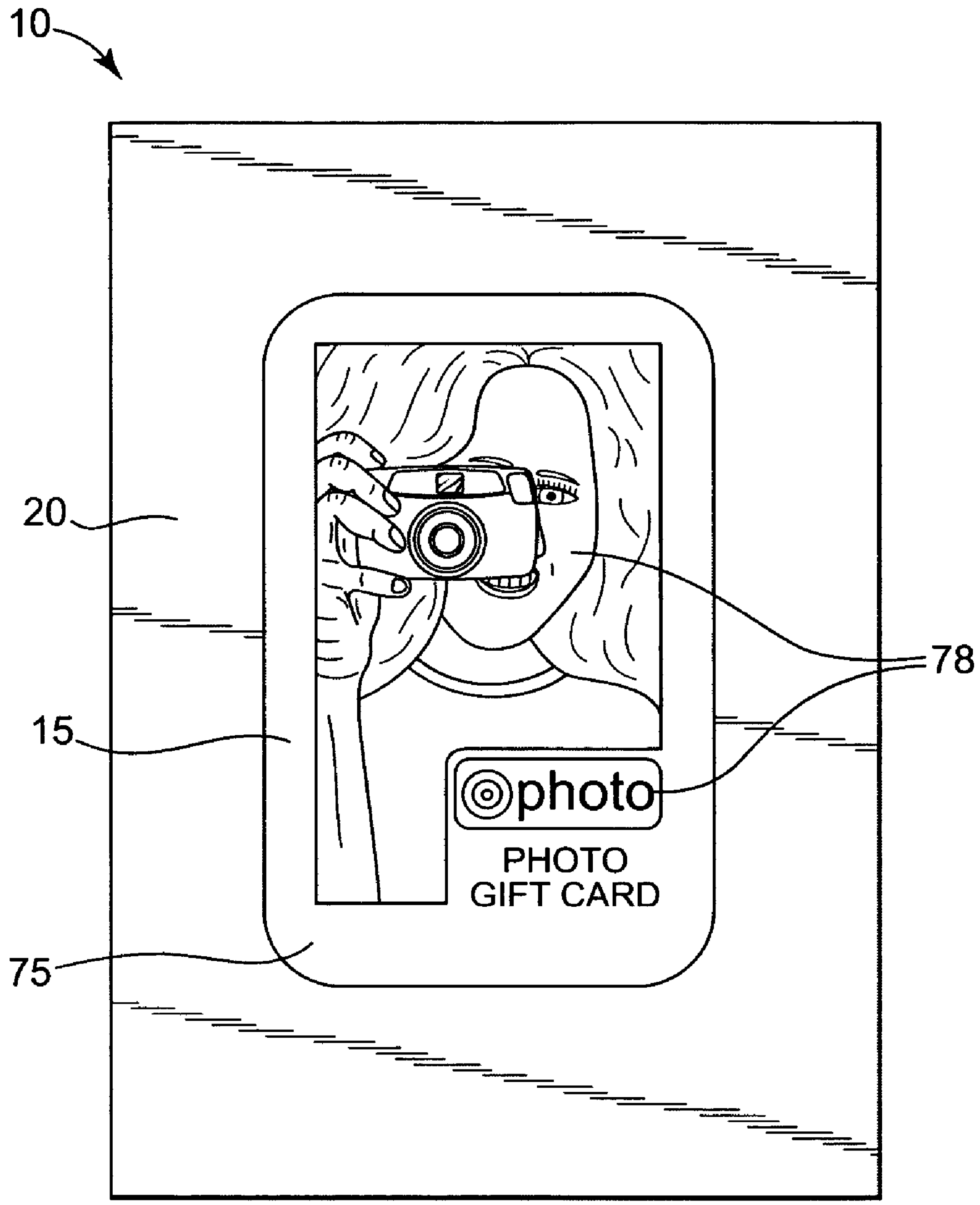
FIG. 1 is a front view of a financial transaction card assembly, according to an embodiment of the invention.
Figure 2:
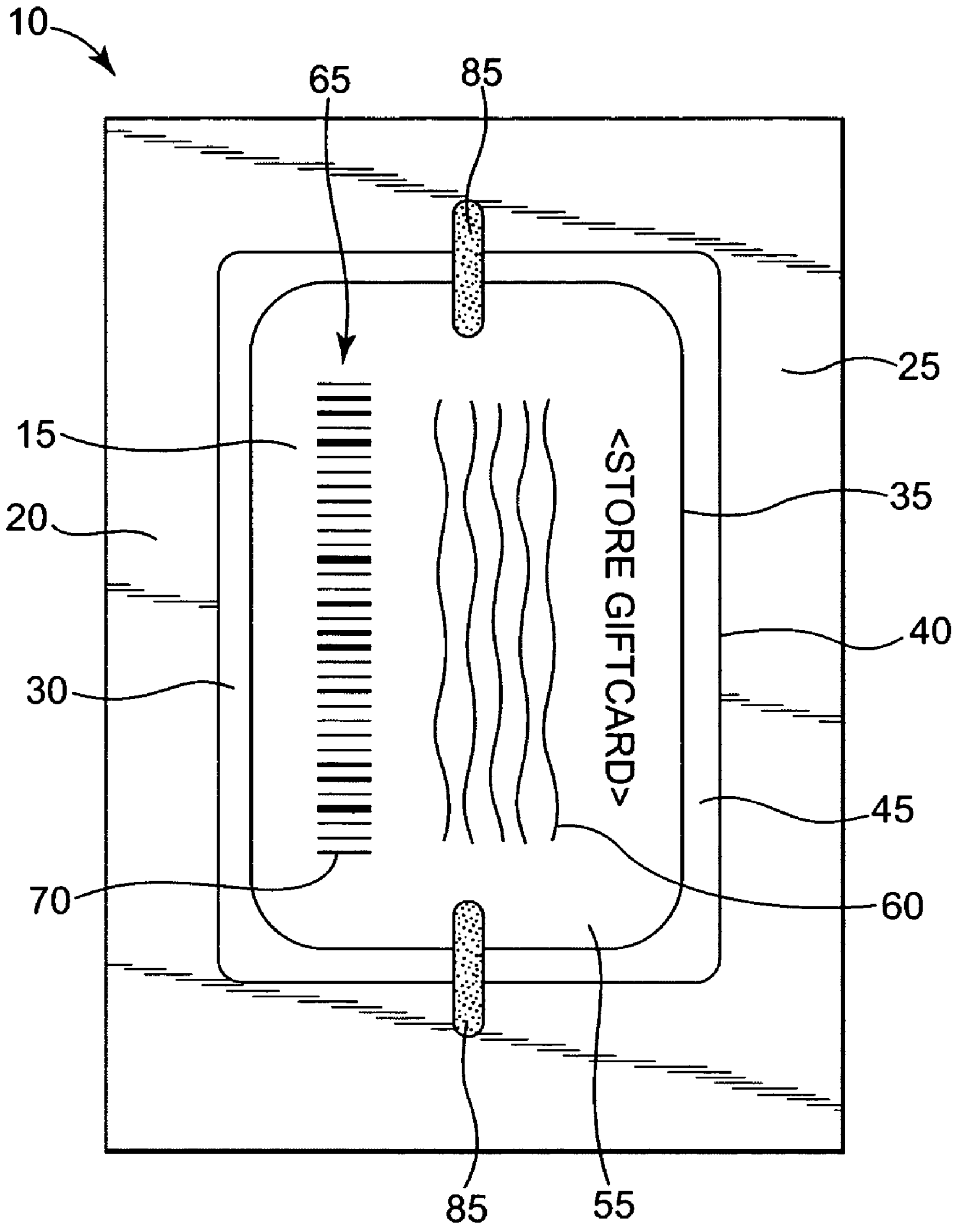
FIG. 2 is a rear view of the FIG. 1 assembly.

Turning to the figures, FIGS. 1-2 show financial transaction card assembly 10, comprising financial transaction card or stored-value card 15. Card 15 is adapted for access to a financial account or record. Assembly 10 further comprises frame 20 generally surrounding financial transaction card 15. Frame 20 comprises magnetic material 25 adapted to magnetically adhere to a surface. More specifically, frame 20 comprises a two-ply or two-layer substrate adapted to support card 15, the substrate defining magnetic material 25 as one layer and support 30 for magnetic material 25 as another layer. Magnetic material 25 is or comprises magnetic sheet material, according to one embodiment. Support 30 is a plastic, vinyl, paper, or other material, according to one embodiment, adapted to provide enhanced structural rigidity for magnetic sheet material 25 while still being flexible to accommodate bending of frame 20. Magnetic sheet material 25, and thus frame 20, are adapted for magnetic attraction to a surface, such as a refrigerator or cabinet.

Support 30 defines opening 35 adapted to support card 15 within it. Card 15 is formed of a different material than and/or is substantially more rigid than the layers of frame 20, according to one embodiment, and is of the shape and size of a credit card, gift card or other generally wallet-sized card. Card 15 is supported within opening 35 by a friction fit, by one or more plastic ties or overlays, or by adhesive, for example. Card 15 is disposed within, and readily removably connected to, frame 20. According to one embodiment, card 15 and support 30 of frame 20 are formed of the same material, with card 15 being completely or partially cut from support 30, or at least partially defined with respect to support 30 by score lines or perforations, for example. Card 15 is substantially flush with and generally coplanar with support 30, according to one embodiment.

The other of the two layers of frame or substrate 20, e.g. magnetic sheet material 25, defines opening 40. Opening 40 defined in sheet material 25 is generally larger than opening 35 defined in support 30. Opening 40 defined in sheet material 25 is also larger than card 15. Because opening 40 is larger than opening 35, a portion 45 of support 30 is exposed behind sheet material 25 (as viewed in FIG. 2). Removal of card 15 from its position disposed within frame 20 opens and exposes opening 35 through frame 20.

Instead of a two-layer frame 20, embodiments of the invention also contemplate a single-layer frame 20, e.g. a frame formed of magnetic sheet material 25 alone. In that case, card 15 is disposed in an opening in the sheet material 25.

Figure 3:
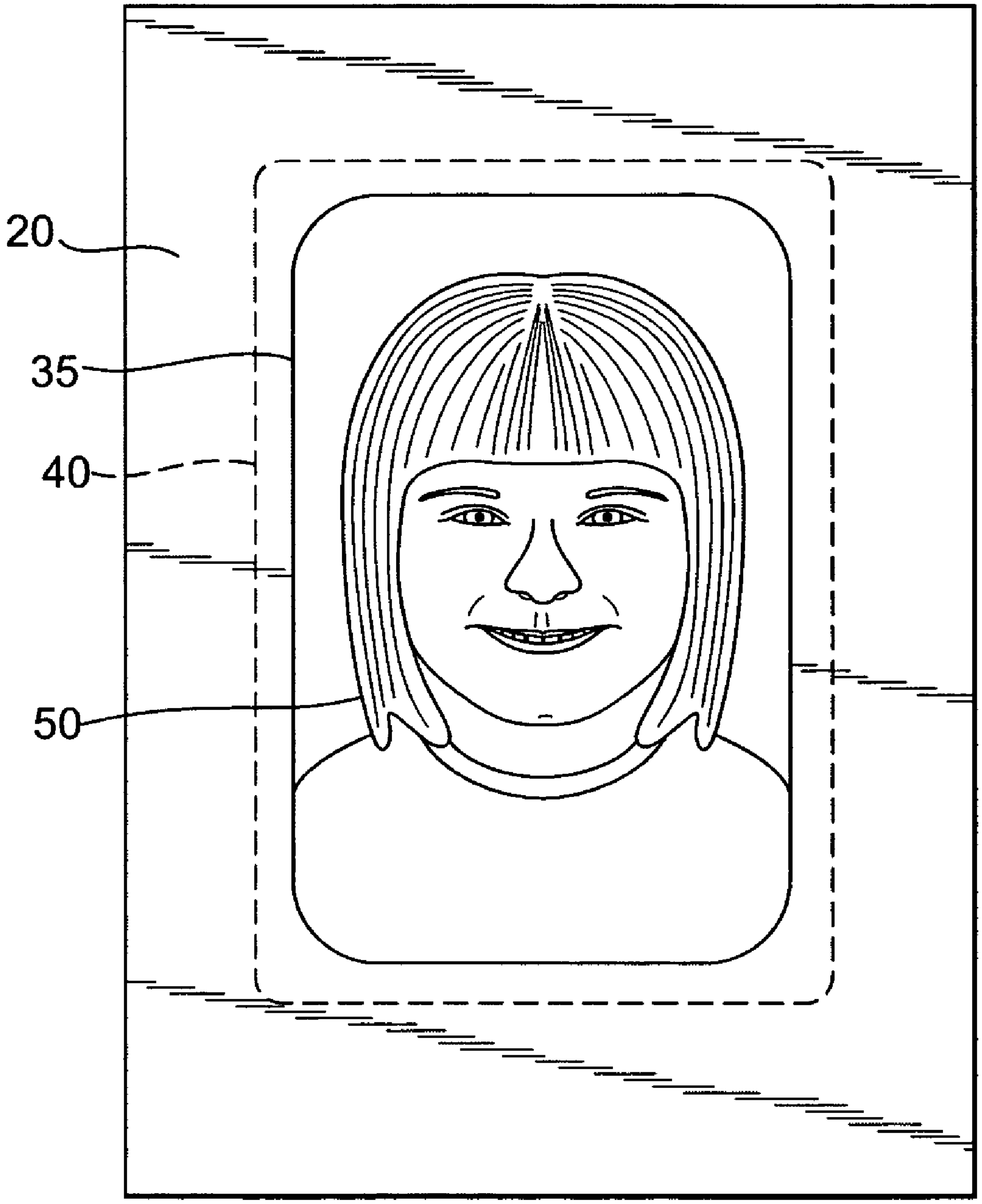
FIG. 3 is a front view of a financial transaction card assembly with a photograph instead of a financial transaction card, according to an embodiment of the invention.
Figure 4:
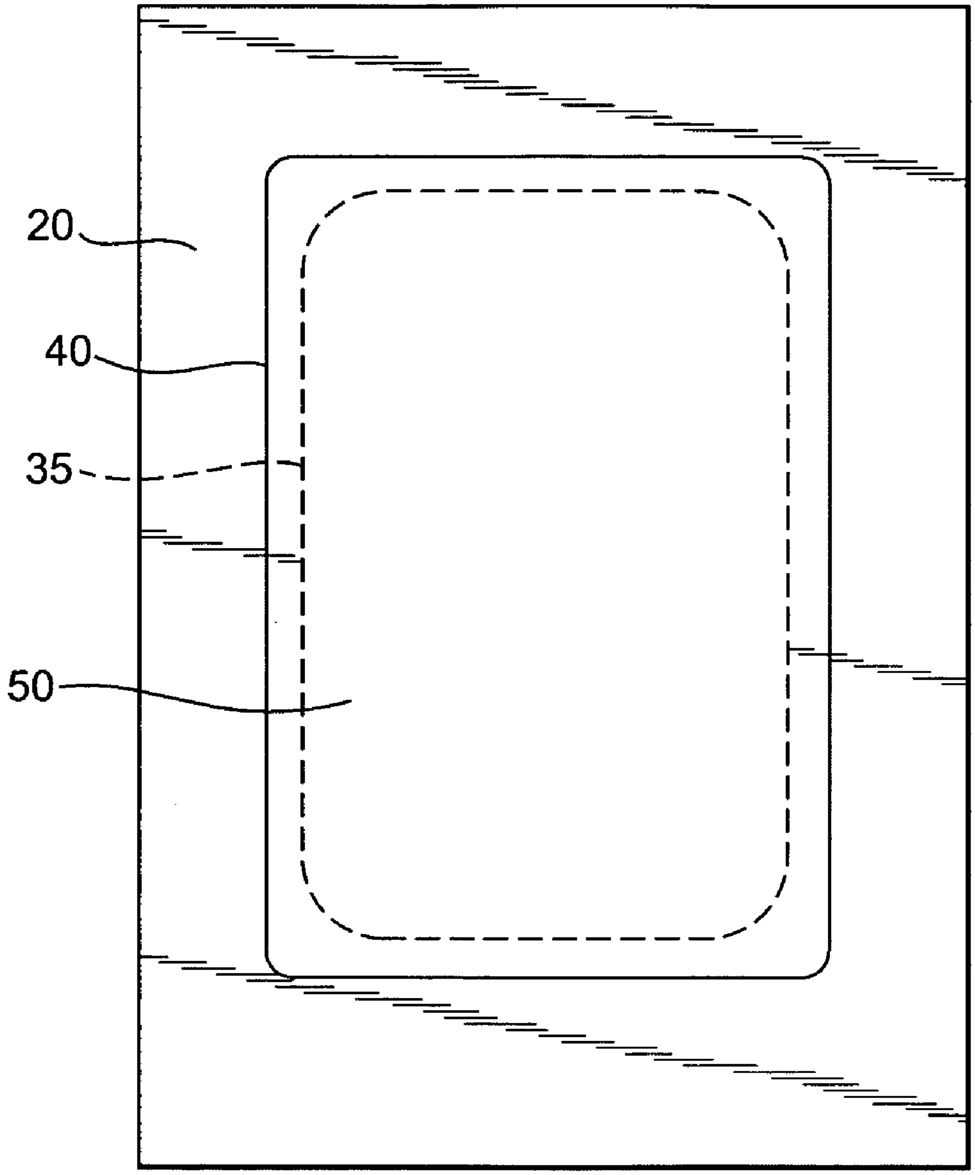
FIG. 4 is a rear view of the FIG. 3 assembly.

With reference to FIGS. 3-4, once card 15 is removed, frame 20 is adapted to receive photograph 50 or other display item therewithin. Sheet 25 of magnetic material supports frame 20 and photograph 50 on a refrigerator or other metallic surface, according to embodiments of the invention. The outer edge of photograph 50 generally abuts the edge of opening 40, according to embodiments of the invention, such that an outer front border area of photograph 50 is disposed against exposed portion 45 of support 30. Frame 20 also can be used to support larger photographs, e.g. by holding such photographs against the refrigerator or other surface to which frame 20 adheres.

FIGS. 1-2 show additional details of card 15. Card 15 is, for example, a card used by a merchant to issue a spending credit to a customer. The merchant provides the card in exchange for money received, merchandise returned or other consideration. The card is "loadable" with monetary value, for example a dollar value that the merchant's customer can use or give to another individual. A record of the monetary balance on the card optionally is maintained on a database, other electronic or manual record-keeping system, or, in the case of "smart" cards, for example, on a chip or other electronics or devices on the card itself.

Card 15 includes rear surface 55, shown in FIG. 2. Surface 55 includes indicia 60, according to embodiments of the invention, indicating one or more of the following: that card 15 is redeemable for merchandise or services at a retail store, at another retail store in a common chain of retail stores, at an Internet site, or elsewhere, that card 15 is not redeemable for cash or credit except where required by law, that a lost, damaged or stolen card can be reported by telephone so that the retail store can replace the remaining value upon presentation of the original purchase receipt, and that card 15 has no value until purchased.

Surface 55 of card 15 also includes activation area 65. According to the illustrated embodiment, activation area 65 includes bar code 70. Alternatively, or additionally, activation area 65 may include a magnetic strip, a smart chip or other electronic device, a radio frequency identification device, or other identification device or indicia, such as a card number and/or event number. Bar code 70 or other activation-area feature optionally represents an account number or otherwise serves to link card 15 to a database or other electronic or manual storage device or system. In the case of a stored-value card, activation area 65 is adapted for loading of the stored-value card with monetary value.

The opposite surface 75 of card 15, e.g. the front surface thereof, is visible in FIG. 1. Surface 75 optionally includes indicia 78, e.g. in the form of text, drawings, pictures, branding, or other information. Indicia 78 optionally includes a picture of a person holding a camera and the words "Photo" and "GiftCard", for example, for the purpose of advertising photo finishing services or other photo department goods/services offered by a retail store or chain of retail stores. Such branding optionally is color-coordinated or otherwise coordinated with a color scheme or other indicia on a front surface of frame 20. Embodiments of card 15 thus are adapted for payment of photo department purchases and include indicia 78 indicating that card 15 is so adapted.

Figure 5:
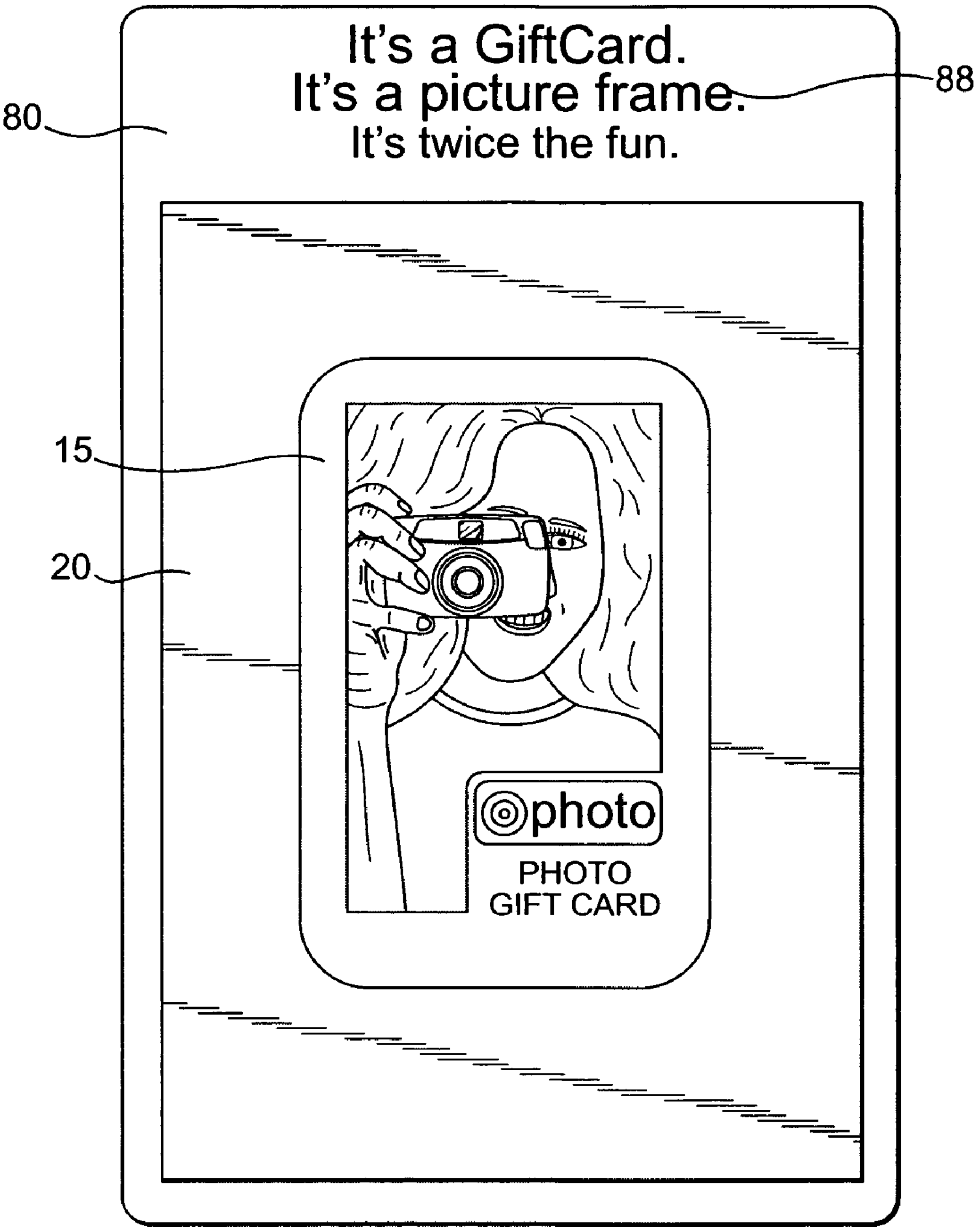
FIG. 5 is a front view of the FIG. 1 assembly including a backer, according to an embodiment of the invention.
Figure 6:
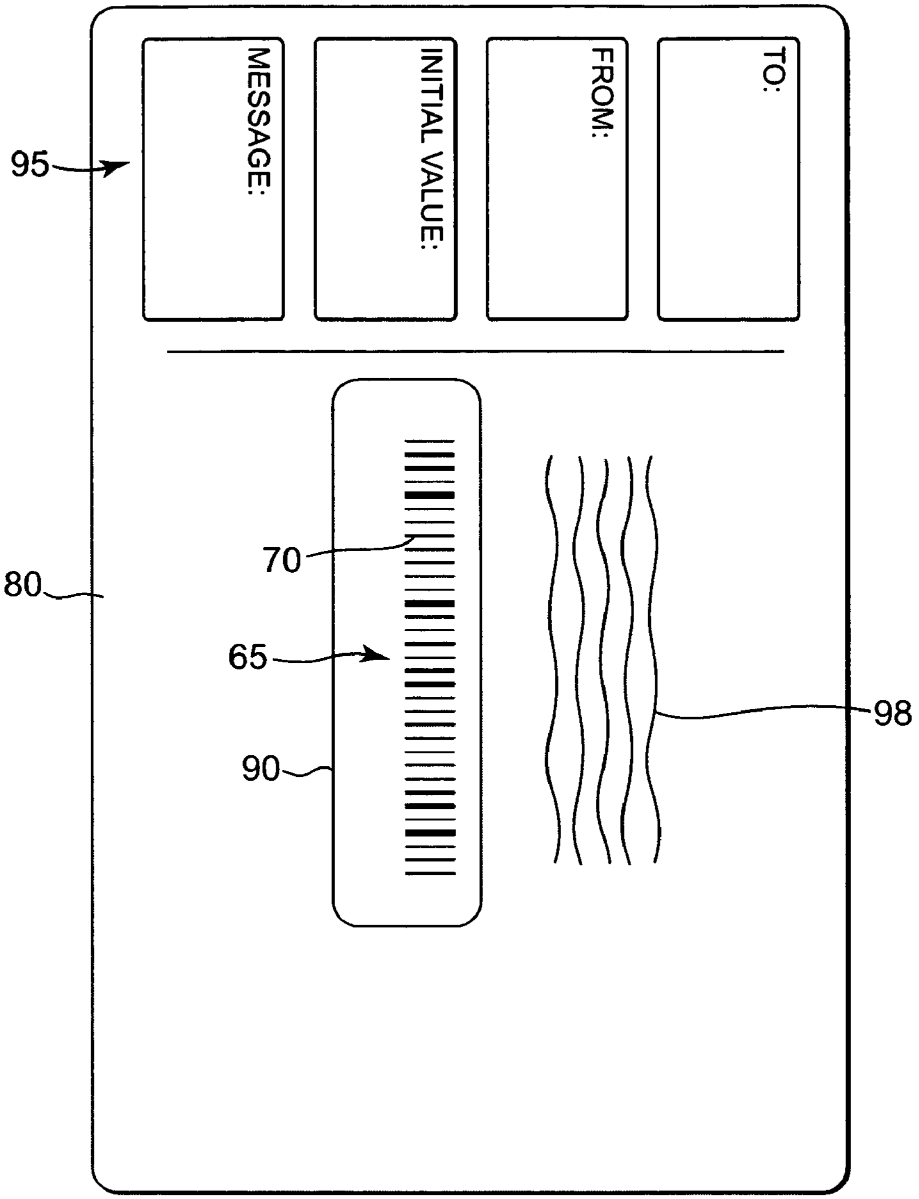
FIG. 6 is a rear view of the FIG. 5 assembly.

Financial transaction card assemblies according to embodiments of the invention additionally include backer 80, shown in FIGS. 5-6. Backer 80 is a substrate comprising a single layer or multiple layers of paper or plastic material, for example, generally in the form of a relatively stiff but bendable/flexible card. Other materials are also contemplated. Frame 20 and card 15 together are readily removably attached to backer 80. According to one embodiment, line of adhesive 85, illustrated in FIG. 2, extends across magnetic sheet material 25, overlap area portion 45 and card 15, i.e. adhesive 85 extends across a border between frame 20 and card 15. Adhesive 85 optionally is in a line comprising two parts, as illustrated in FIG. 2, one on each end of card 15. Adhesive 85 serves to attach frame 20 and card 15 to backer 80. Adhesive 85 also serves to hold card 15 in place within opening 35 of frame 20, according to embodiments of the invention.

A front surface of backer 80 (FIG. 5) includes indicia 88 indicating that assembly 10 is useable both as a stored-value card or other financial transaction card and that frame 20 is useable as a support for photographs or other display items. For example indicia 88 states "It's a GiftCard. It's a picture frame. It's twice the fun.".

A rear surface of backer 80 (FIG. 6) defines aperture 90 aligned with card 15, and specifically with activation area 65 thereof. Aperture 90 exposes bar code 70 or other indicia on card 15 adapted to link card 15 to a financial account or record, as described earlier herein. Card 15 optionally is activated or loaded by accessing bar code 70 through aperture 90. Aperture 90 also can reveal additional information disposed on card 15 within activation area 65, e.g. a card number, an event number, an access number, or other information. Backer 80 additionally defines manual writing areas 95, optionally labeled "To", "From", "Initial Value", and "Message", for example. Indicia 98 provide additional information regarding use of card 15, e.g. similar in nature to indicia 60 disposed on card 15.

Figure 7:
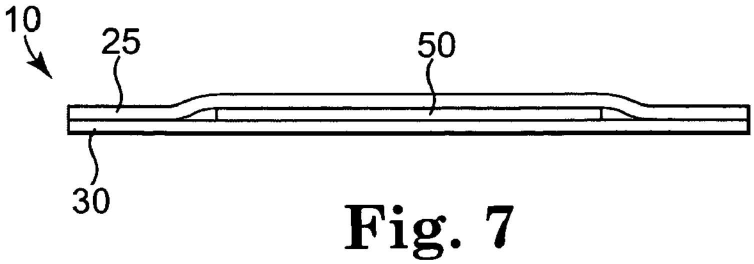
FIG. 7 is an end view of a financial transaction card assembly, according to an embodiment of the invention.

FIG. 7 illustrates an embodiment of assembly 10 in which layers 25, 30 of frame 20 are at least partially separable from each other, e.g. in areas between corners of frame 20. Photograph 50 or other display item optionally is supported between layers 25, 30, at least partially, to provide additional support for photograph 50 on the refrigerator or other metallic surface to which frame 20 is adhered. Thus, according to embodiments of the invention, two layers 25, 30 are separable to accommodate photograph 50 inserted between them for display by frame or substrate 20. One or both of the two layers, e.g. support 30 and/or sheet 25 of magnetic material, are adapted to support card 15 therewithin with separation of the two layers. Additionally, whether or not assembly 10 includes separable layers 25, 30, photograph 50 or other display item is supportable within e.g. opening 40 defined in layer 25 without separation of the layers. Further, according to embodiments of the invention, frame 20 is optionally dimensioned to generally match or be larger than a common photograph size, e.g. 3.5"×5", such that photograph 50 is entirely overlapped by frame 20 and held against the refrigerator or other surface. In that case, a central portion of photograph 50 is exposed through opening 35 of frame 20.

According to embodiments of the invention, card assembly 10 is an example of a financial transaction card product including means (e.g. opening 35 and/or adhesive 85) for removably supporting a financial transaction card 15 by picture frame 20, means (e.g. activation area 65, bar code 70) for linking financial transaction card 15 with a financial account or record, and means (e.g. backer 80) for supporting both financial transaction card 15 and picture frame 20. The means for linking also functions as, or in addition to, means for activating or loading value on the financial transaction card through the means for supporting, e.g. through aperture 90 in backer 80.

Figure 8:
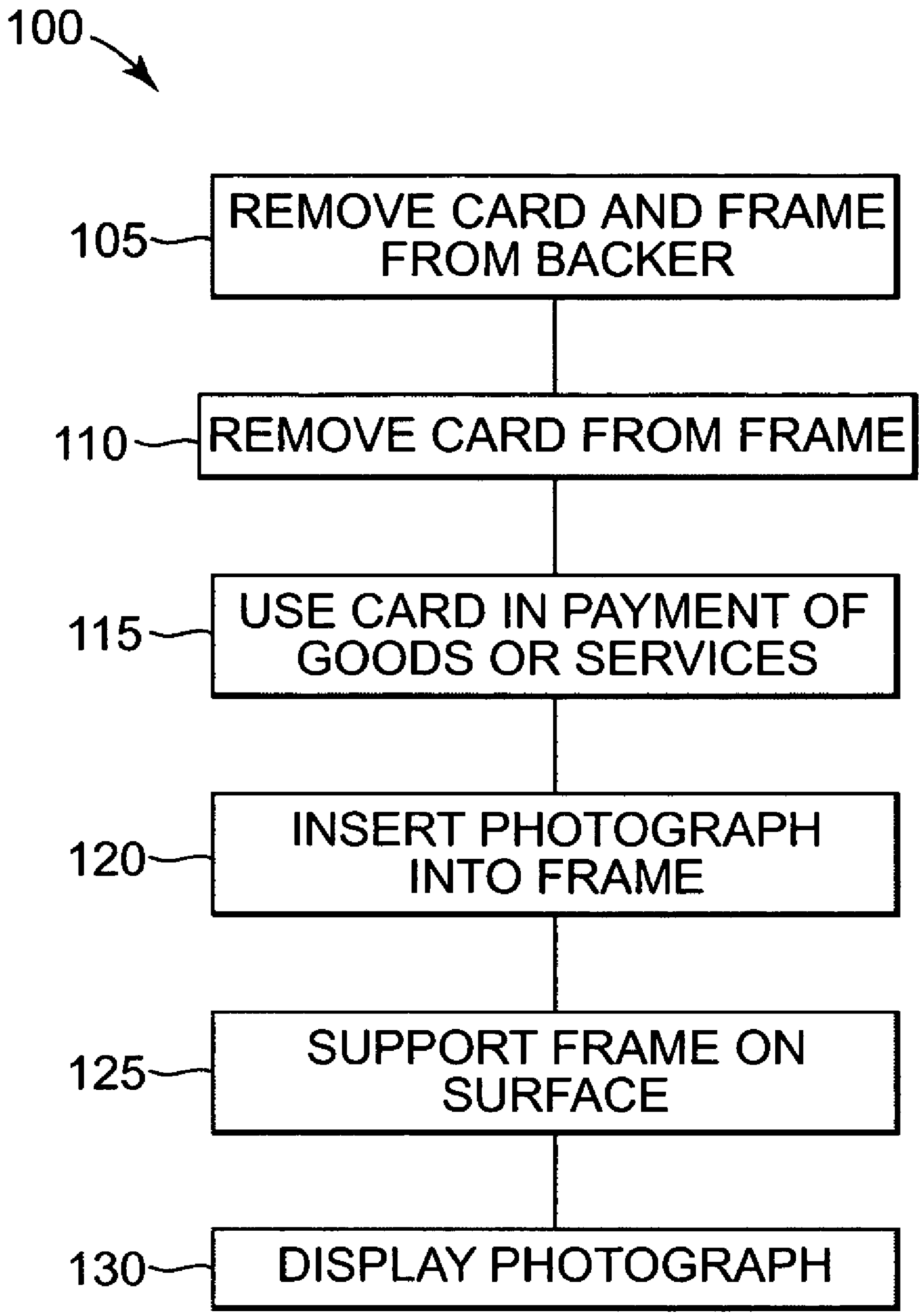
FIGS. 8-10 are flow charts showing method embodiments according to the invention.

Turning to FIG. 8, method 100 of using a card linked to a financial account or record comprises removing, at 105, card 15 and magnetic photo frame 20 from backer 80, and removing, at 110, card 15 from frame 20. Card 15 is used in payment of goods or services, at 115, the value of the goods or services being deducted from the financial account or record. At 120, photograph 50 is inserted into magnetic photo frame 20. At 125, magnetic photo frame is supported magnetically on a surface. At 130, photograph 50 is displayed within magnetic photo frame 20. Removing 110 optionally comprises removing card 15 from first aperture or opening 35 defined by magnetic photo frame 20, and inserting 120 comprises inserting photograph 50 into second opening or aperture 40 defined by magnetic photo frame 20. Second aperture 40 is larger than first aperture 35. Card 15 is loaded or activated through aperture 90 in backer 80.

Figure 9:
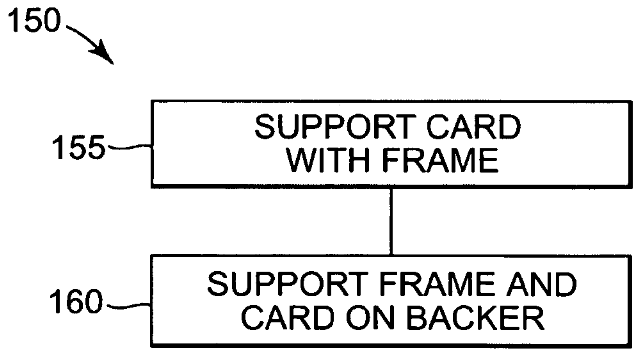

FIG. 9 illustrates method 150 of making a financial transaction card product, the method comprising supporting, at 155, financial transaction card 15 within magnetic photo frame 20. Financial transaction card 15 includes a portion, such as bar code 70, for linking to a financial account or record. Method 150 further includes supporting, at 160, magnetic photo frame 20 and financial transaction card 15 on backer 80. Card 15 optionally is supported within first aperture 35 of frame 20. Second aperture 40 optionally is provided within frame 20, between frame 20 and backer 80, and is larger than first aperture 35.

Figure 10:
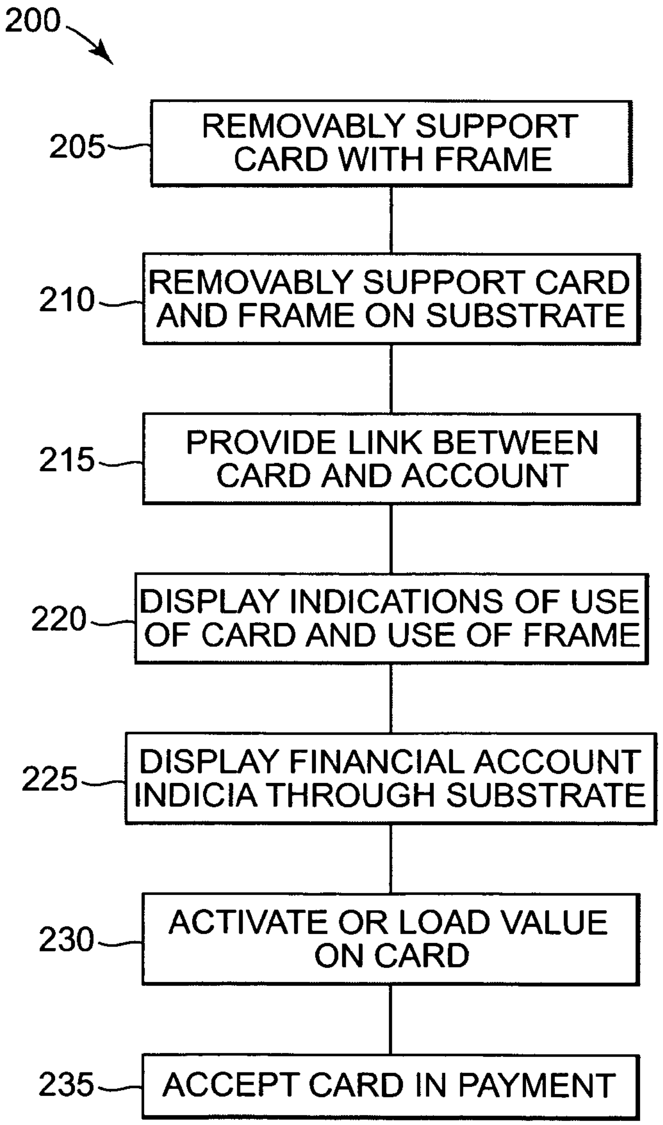

FIG. 10 illustrates method 200 of encouraging purchase or use of financial transaction card 15. Method 200 includes, at 205, removably supporting card 15 with picture frame 20, removably supporting, at 210, card 15 and frame 20 together on backer or substrate 80, providing, at 215, a link between card 15 and a financial account or record, and displaying, at 220, an indication that card 15 is usable as a financial transaction card and that picture frame 20 is usable as a picture frame. Displaying 220 optionally includes displaying the indication on substrate 80. Method 200 additionally includes, at 225, displaying through substrate 80 financial account indicia 70 disposed on financial transaction card 15. A recess defined by aperture 40 is defined within frame 20, the recess being larger than card 15 in order to accommodate picture 50. Method 200 additionally includes, at 230, activating or loading value on card 15, and, at 235, accepting card 15 in payment of goods or services. Such services optionally include photo finishing services or other photo department services, and such goods optionally include photo department goods. Method 200 optionally includes displaying card 15 and photo frame 20 together in a retail store. Method 200 also optionally includes encouraging support of frame 20 magnetically on a surface, with photograph 50 in place of card 15.

Stored-value cards and other financial transaction cards come in many forms, according to embodiments of the invention. A gift card, for example, includes pre-loaded or selectably loaded monetary value. In one example, a customer provides consideration in the amount of the card value, or is offered the gift card as an incentive to make a purchase, and then either keeps the card for use or provides the card as a gift to a recipient. The gift card, like other stored-value cards, can be "recharged" or "reloaded" at the direction of the original customer, the gift recipient, or a third party. The balance associated with the card declines as the card is used, encouraging repeat visits. The card remains in the user's purse or wallet, serving as an advertisement or reminder to re-visit the associated merchant. Gift cards according to embodiments of the invention provide a number of advantages to both the customer and the merchant. Other stored-value cards according to embodiments of the invention include loyalty cards, merchandise return cards, electronic gift certificates, employee cards, frequency cards, pre-paid cards, and other types of cards associated with or representing purchasing power or monetary value, for example. Other financial transaction cards such as credit cards, debit cards, phone cards, etc., also are contemplated according to embodiments of the invention.

Although the invention has been described with respect to particular embodiments, such embodiments are for illustrative purposes only and should not be considered to limit the invention. Various alternatives and changes will be apparent to those of ordinary skill.

What is claimed is:

1. A financial transaction card assembly, comprising:

a financial transaction card including a machine readable activation area linked to a financial account or record, the activation area including at least one of a bar code, a magnetic strip, a smart chip or other electronic device, a radio frequency identification device, a card number, and an event number; and a photo frame supporting the financial transaction card, the photo frame comprising a magnetic material, the photo frame being adapted to magnetically adhere to a separate surface to frame a photo following removal of the photo frame from the financial transaction card.

2. The assembly of claim 1, wherein the financial transaction card is readily removably connected to the frame.

3. The assembly of claim 2, wherein the financial transaction card is disposed within the frame.

4. The assembly of claim 2, wherein the financial transaction card is disposed within an opening through the frame, such that removal of the financial transaction card exposes the opening through the frame.

5. The assembly of claim 4, wherein the frame is adapted to receive and support a photograph in place of the financial transaction card.

6. The assembly of claim 1, further comprising a backer, the frame and financial transaction card together being readily removably attached to the backer.

7. The assembly of claim 6, further comprising adhesive disposed across a border between the frame and the financial transaction card, wherein the frame and the financial transaction card together are attached to the backer by the adhesive.

8. The assembly of claim 6, wherein the backer defines an aperture aligned with the financial transaction card.

9. The assembly of claim 8, wherein the aperture exposes the activation area on the financial transaction card.

10. The assembly of claim 1, wherein the financial transaction card comprises indicia adapted to link the financial transaction card to the financial account or record.

11. The assembly of claim 1, wherein the financial transaction card comprises indicia indicating that the financial transaction card is adapted for payment of photo department purchases.

12. The assembly of claim 1, further comprising a backer supporting the photo frame and the financial transaction card, wherein the activation area is adapted to be read while the photo frame and the financial transaction card are supported by the backer.

13. A method of using a card linked to a financial account or record, comprising:

removing the card from a magnetic photo frame;

using the card in payment of goods or services, the value of the goods or services being deducted from the financial account or record;

supporting the magnetic photo frame magnetically on a separate surface; and displaying a photograph supported by the magnetic photo frame.

14. The method of claim 13, further comprising inserting a photograph into the magnetic photo frame.

15. The method of claim 14, wherein the magnetic photo frame includes a first layer defining a first aperture and a second layer defining a second aperture:

the removing comprises removing the card from the first aperture defined by the magnetic photo frame; and the inserting comprises inserting the photograph into the second aperture defined by the magnetic photo frame.

16. The method of claim 15, wherein the second aperture is larger than the first aperture.

17. The method of claim 13, further comprising removing the card and the magnetic photo frame from a backer.

18. The method of claim 17, further comprising loading or activating the card by accessing an activation area of the card through an aperture in the backer.

19. A method of making a financial transaction card product, the method comprising:

supporting a financial transaction card with a magnetic photo frame, the financial transaction card including a machine readable portion for linking to a financial account or record; and supporting the magnetic photo frame and the financial transaction card on a backer;

wherein the machine readable portion is accessible while the magnetic photo frame and the financial transaction card are supported on the backer.

20. The method of claim 19, further comprising supporting the financial transaction card within a first aperture of the magnetic photo frame.

21. The method of claim 20, further comprising providing a second aperture of the magnetic photo frame, larger than the first aperture, between the magnetic photo frame and the backer.

22. The method of claim 20, wherein the magnetic photo frame includes a first layer and a second layer, the first layer defining the first aperture, and the second layer defining a second aperture larger than the first aperture and larger than the financial transaction card.

23. The method of claim 22, wherein the second layer is a magnetic layer.

24. A financial transaction card product, comprising:

means for removably supporting a financial transaction card with a picture frame;

means for linking the financial transaction card with a financial account or record; and means for supporting both the financial transaction card and the picture frame.

25. The product of claim 24, further comprising means for activating or loading value on the financial transaction card through the means for supporting.

26. The product of claim 24, wherein the picture frame defines a layer having an opening that is larger than the financial transaction card.

27. A method of encouraging purchase or use of a financial transaction card, the method comprising:

removably supporting a financial transaction card with a picture frame; and providing a link between the financial transaction card and a financial account or record;

displaying an indication that the financial transaction card is useable as a financial transaction card separable from the picture frame and that the picture frame is useable as a picture frame; and providing a recess within the picture frame, the recess being larger than the financial transaction card to accommodate a picture.

28. The method of claim 27, further comprising removably supporting the financial transaction card and the picture frame together on a substrate.

29. The method of claim 28, wherein the displaying includes displaying the indication on the substrate.

30. The method of claim 28, further comprising displaying through the substrate financial account indicia disposed on the financial transaction card.

31. The method of claim 27, further comprising loading value on the financial transaction card.

32. The method of claim 31, further comprising accepting the financial transaction card in payment of goods or services.

33. The method of claim 27, further comprising activating the financial transaction card.

34. The method of claim 27, further comprising accepting the financial transaction card in payment of photo department purchases.

35. The method of claim 27, further comprising displaying the financial transaction card and photo frame together in a retail store.

36. The method of claim 27, further comprising encouraging support of the photo frame magnetically on a surface, with a photograph in place of the financial transaction card.

* * * * *